US012444827B2

(12) United States Patent
Hussain et al.

(10) Patent No.: US 12,444,827 B2
(45) Date of Patent: Oct. 14, 2025

(54) TRANSPARENT MIMO ANTENNA FOR CLOSELY SPACED ANTENNA ELEMENTS

(71) Applicant: KING FAHD UNIVERSITY OF PETROLEUM AND MINERALS, Dhahran (SA)

(72) Inventors: Rifaqat Hussain, Dhahran (SA); Muhammad Nawaz Abbasi, Dhahran (SA); Abdul Aziz, Dhahran (SA); Naveed Iqbal, Dhahran (SA); Azzedine Zerguine, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 259 days.

(21) Appl. No.: 18/177,506

(22) Filed: Mar. 2, 2023

(65) Prior Publication Data

US 2024/0297430 A1 Sep. 5, 2024

(51) Int. Cl.

*H01Q 1/12* (2006.01)
*H01Q 9/04* (2006.01)
*H01Q 21/06* (2006.01)

(52) U.S. Cl.

CPC ......... *H01Q 1/1271* (2013.01); *H01Q 9/0407* (2013.01); *H01Q 21/06* (2013.01)

(58) Field of Classification Search

CPC .... H01Q 1/1271; H01Q 9/0407; H01Q 21/06; H01Q 1/36; H01Q 21/065; H01Q 1/38

See application file for complete search history.

(56) References Cited

U.S. PATENT DOCUMENTS

2009/0051620 A1 2/2009 Ishibashi et al.
2009/0140938 A1* 6/2009 Ishibashi .................. H01Q 1/44 343/897

(Continued)

FOREIGN PATENT DOCUMENTS

CN 108028470 B * 6/2021 ........... G02B 6/0041
CN 111164828 B * 12/2021 .............. B41F 19/00

OTHER PUBLICATIONS

Ali, et al. ; Design of transparent microstrip grid array antenna ; Indonesian Journal of Electrical Engineering and Computer Science, vol. 15, No. 2 ; Aug. 2019 ; 6 Pages.

*Primary Examiner* — David E Lotter

(74) *Attorney, Agent, or Firm* — Oblon, McClelland, Maier &Neustadt, L.L.P.

(57) ABSTRACT

An antenna is disclosed. The antenna includes a transparent substrate, a first square patch antenna element with a square lattice structure, a second square patch antenna element and a low profile transparent passive decoupling strip. The first square patch antenna element is disposed on the transparent substrate. The first square patch antenna element includes horizontal conductive wires and vertical conductive wires. The horizontal conductive wires and the vertical conductive wires cross each other and are equally spaced to form square spaces between. The second square patch antenna element is disposed on the transparent substrate. The second square patch antenna element has a structure identical to the structure of the first square patch antenna element. The first and the second square patch antenna elements are spaced apart from each other. The low profile transparent passive decoupling strip is disposed between the first and the second square patch antenna elements.

20 Claims, 11 Drawing Sheets

(56) References Cited

U.S. PATENT DOCUMENTS

| | | | | |
|---|---|---|---|---|
| 2013/0264390 | A1 | 10/2013 | Frey et al. | |
| 2014/0139379 | A1 | 5/2014 | Bolin et al. | |
| 2015/0343884 | A1* | 12/2015 | Rousselet | B60J 1/002<br>359/360 |
| 2019/0386386 | A1* | 12/2019 | Fernandez | H01Q 1/005 |
| 2020/0091599 | A1* | 3/2020 | Nakamura | H01Q 1/38 |
| 2024/0195069 | A1* | 6/2024 | Zhang | H01Q 1/1271 |

* cited by examiner

410

420

TRANSPARENT MIMO ANTENNA FOR CLOSELY SPACED ANTENNA ELEMENTS

BACKGROUND

Technical Field

The present disclosure is directed to a transparent multiple input multiple output (MIMO) antenna for closely spaced antenna elements.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A transparent antenna is an antenna that is optically transparent or allows the passage of visible light through the antenna. The transparent antenna can be integrated into the surface of windows, screens, and car sunroofs without any significant visual impact on the surface. For example, an optically transparent a Global Positioning System (GPS) antenna can be integrated into a car's windshield, and a transparent Radio Frequency Identification (RFID) reader antenna can be fitted for smart fitting room applications. Optically transparent antennas can be placed over the solar panels of satellites, which would conserve space utilized to integrate antennas in the main body of the satellites. However, conventional optical transparent antennas fail to achieve directional radiation, resulting in low effective utilization of radiated power.

With the growth in technology, transparent antennas can be used for radar absorbing and scattering, beam steering, and wearable devices (as in Bluetooth antennas). Transparent antennas can be integrated over the display of the wearable device rather than inside the device body, which will reduce the overall size of the device and make it more compact and/or slimmer. It is desirable to employ transparent as well as conductive materials in the transparent antenna. For example, transparent conducting oxides are considered a good option due to their optical transparency and conductivity. In some transparent antennas, a transparent metal oxide film, such as an indium tin oxide film (ITO film), may be used. However, the use of ITO is limited due to the fact that indium is not only fragile and expensive, but also a rare earth metal. In some examples, a multilayered film (MLF) having an indium zinc thin oxide layer with a silver coating (IZTO/Ag/IZTO) is considered more flexible and relatively less expensive. Transparent antennas with MLF ground planes have shown poor efficiency in comparison with other types of transparent antennas.

In addition, compared to conventional thin film transparent antennas, a wired metal mesh type transparent antenna has sufficient conductivity, suitable transparency, and optical characteristics, as well as a relatively low fabrication cost. Wired metal mesh transparent electrodes possess high conductivity and low resistance, thereby increasing the possibility of using transparent antennas in patch, monopole, and arrayed antenna applications. Multiple-input multiple-output (MIMO) transparent antennas for indoor small base stations can be used for various applications and are also considered more suitable for achieving higher data rates. MIMO transparent antennas are considered the best solution, particularly for indoor applications within a limited space. So, the compact size of a MIMO antenna system is a basic requirement for such applications. However, a compact MIMO antenna system may need to have closely spaced MIMO antenna elements, which may cause strong mutual coupling between closely spaced antenna elements and affect the performance of the MIMO antenna system.

Hence, there is a need for an antenna that is configured to provide suitable isolation between closely spaced transparent antenna elements.

SUMMARY

In an exemplary embodiment, an antenna is described. The antenna includes a transparent substrate, a first square patch antenna element with a square lattice structure, a second square patch antenna element, and a low profile transparent passive decoupling strip. The first square patch antenna element with a square lattice structure is disposed on the transparent substrate. The first square patch antenna element includes horizontal conductive wires and vertical conductive wires. The horizontal conductive wires and the vertical conductive wires cross each other and are equally spaced to form square spaces between. The second square patch antenna element is disposed on the transparent substrate. The second square patch antenna element has a structure identical to the structure of the first square patch antenna element. The first and the second square patch antenna elements are spaced apart from each other. The low profile transparent passive decoupling strip is disposed on the transparent substrate between the first and the second square patch antenna elements.

In another exemplary embodiment, an antenna is described. The antenna includes a transparent substrate, a first square patch antenna element with a square lattice structure, a second square patch antenna element, and a low profile transparent passive decoupling strip. The first square patch antenna element with a square lattice structure is disposed on the transparent substrate, wherein the first square patch antenna element includes horizontal conductive wires and vertical conductive wires. The horizontal conductive wires and the vertical conductive wires cross each other and are equally spaced to form square spaces between. The second square patch antenna element is disposed on the transparent substrate. The second square patch antenna element has a structure identical to the structure of the first square patch antenna element. The first and the second square patch antenna elements are spaced apart from each other. The low profile transparent passive decoupling strip is disposed on the transparent substrate between the first and the second square patch antenna elements. The first square patch antenna element and the second square patch antenna element are further configured to have 7 columns of square spaces. The first, second, sixth, and seventh column includes 10 rows of square spaces, the third and fifth column includes 6 rows of square spaces, and the fourth column includes 16 rows of square spaces.

In another exemplary embodiment, an antenna is described. The antenna includes a transparent substrate, a first square patch antenna element with a square lattice structure, a second square patch antenna element, and a low profile transparent passive decoupling strip. The first square patch antenna element with a square lattice structure is disposed on the transparent substrate. The first square patch antenna element includes horizontal conductive wires and vertical conductive wires. The horizontal conductive wires and the vertical conductive wires cross each other and are equally spaced to form square spaces between. The second square patch antenna element is disposed on the transparent substrate. The second square patch antenna element has a structure identical to the structure of the first square patch antenna element. The first and the second square patch antenna elements are spaced apart from each other. The low profile transparent passive decoupling strip is disposed on the transparent substrate between the first and the second square patch antenna elements. The antenna is further configured to achieve an optical transparency (OT) of 83%±0.5%, wherein the optical transparency is calculated as:

$$OT = \left[\frac{L}{w+L}\right]^2$$

where L is the edge length of the square space having a length of 2 mm±0.05 mm and w is the wire width of the conductive wires having a width of 0.2 mm±0.05 mm.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
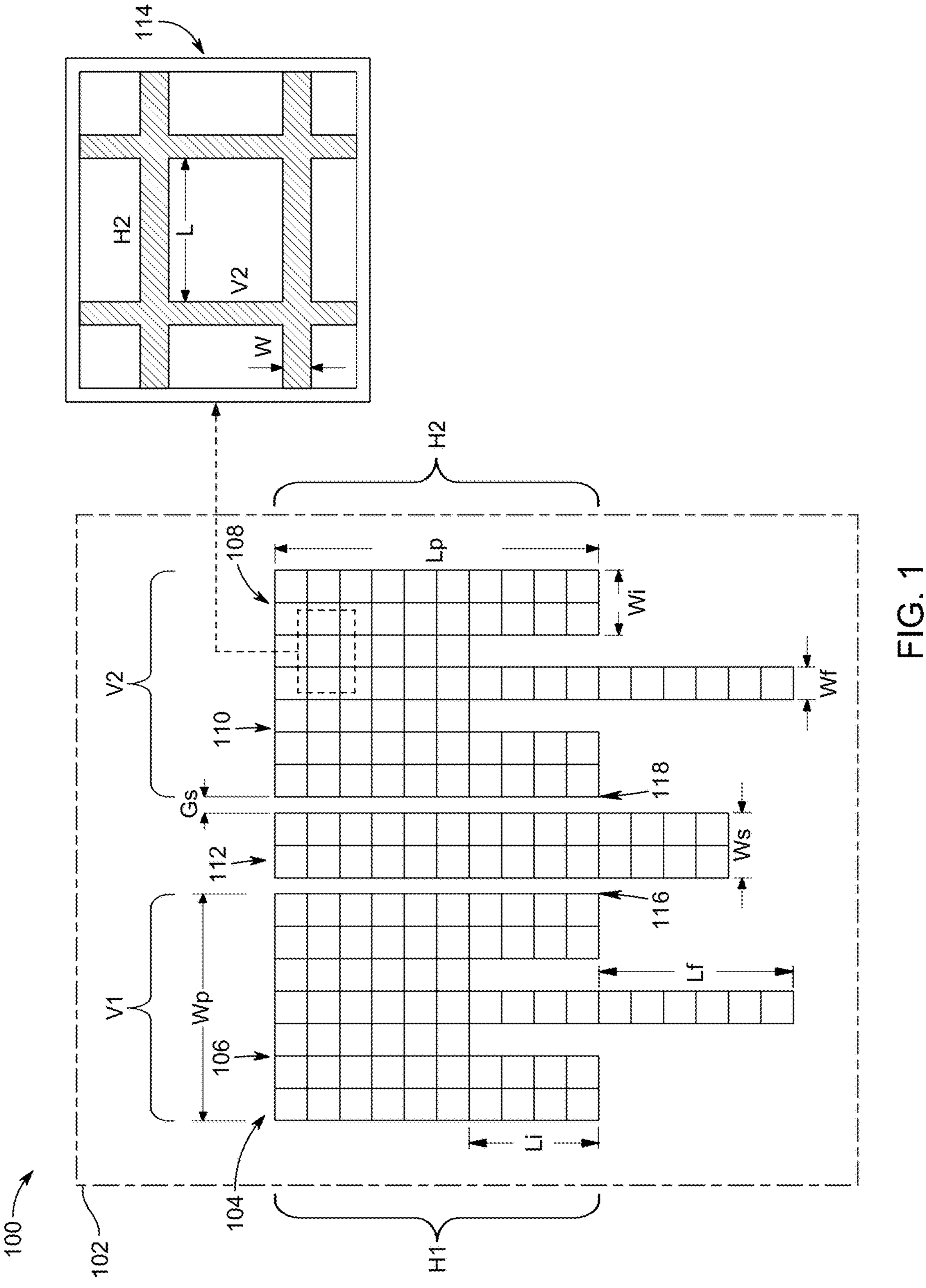
FIG. 1 is a schematic diagram of a transparent Multiple-input, multiple-output (MIMO) antenna, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a transparent multiple input multiple output (MIMO) antenna. In the disclosed antenna, a conductive metal is used to fabricate a square lattice structure (wired metal mesh structure), achieving 83% transparency. The square lattice structure is formed by a plurality of horizontal conductive metal wires and a plurality of vertical conductive metal wires. The length and width of the conductive metal wire forming the squares are used to define the transparency of the MIMO antenna. In the disclosed antenna, the closely spaced transparent antenna elements are isolated by a transparent, thin decoupling structure. The transparent antenna elements are printed on a 1 mm-thick transparent Polyethylene Terephthalate (PET) substrate.

FIG. 1 is a schematic diagram of a transparent MIMO antenna 100 (hereinafter interchangeably referred to as "the antenna 100"), according to one or more aspects of the present disclosure. The antenna 100 includes a transparent substrate 102, a first square patch antenna element 104, a second square patch antenna element 108, and a low profile transparent passive decoupling strip 112. As illustrated in FIG. 1, the width (Ws) of the low profile transparent passive decoupling strip 112 is less than the width (Wp) of the first square patch antenna element 104. For example, the low profile transparent passive decoupling strip 112 can have a width of approximately 0.7 mm, while the first square patch antenna element 104 can have a width of approximately 16 mm, as listed in Table 1. In some example, the transparent substrate 102 may be made of transparent organic materials, for example, but not limited to, polyethylene terephthalate (PET), polyetherimide (PEI), polyphenylene phthalate, polyphenylensulfone, (PPSU), polyimide (PI), polyethylene naphthalate (PEN), cyclic olefin copolymer (COC), liquid crystal polymer (LCP), polyvinyl butyral (PVB), cyclo olefin polymer (COP), acrylate resins or a combination thereof. For example, the transparent substrate 102 is a PET film. In an example, the transparent substrate 102 includes a stack of a plurality of PET layers, preferably at least 5, at least 6, at least 8 or 10 PET layers. Each PET layer preferably has a thickness of 0.1 mm±0.05 mm. In an aspect, the transparent substrate 102 has a dielectric constant of 3.3±0.1.

The first square patch antenna element 104 includes a square lattice structure 106. The first square patch antenna element 104 with the square lattice structure 106 is disposed on the transparent substrate 102. In an aspect, the square lattice structure 106 is formed by a method such as photo-etching, etching with a printing resist, or printing a conductive resin paste. In an example, a metal oxide such as Indium tin oxide (ITO), zinc oxide, or tin oxide can be used in the formation of the square lattice structure 106. In some examples, the square lattice structure 106 is formed by vacuum deposition, sputtering, plating, electrodeposition, or the like. In an aspect, the first square patch antenna element 104 is integrally laminated on the transparent substrate 102 by screen printing, roll coating, transfer, vapor deposition, or the like. In an example, the square lattice structure 106 may be transparent or translucent.

In some examples, each antenna element (the first square patch antenna element 104, the second square patch antenna element 108) may be configured to operate as a transmitting antenna or as a receiving antenna. In some cases, the first square patch antenna element 104 is configured to operate as the transmitting antenna, and the second square patch antenna element 108 is configured to operate as the receiving antenna. In some examples, each antenna element is configured to operate as the transmitting antenna as well as the receiving antenna. In an example, the first square patch antenna element 104 is adapted for transmission and/or reception of electromagnetic radiation polarized in a first direction. In an example, the second square patch antenna element 108 is adapted for transmission and/or reception of electromagnetic radiation polarized in a second direction.

In an operative aspect, each antenna element (the first square patch antenna element 104 and the second square patch antenna element 108) includes a feed portion and a grounding portion. The feed portion and the grounding portion are used to electrically connect with a circuit board of an electronic device using the antenna. Feeding signals from the circuit board are input into the antenna via the feed portion.

The first square patch antenna element 104 includes a plurality of horizontal conductive wires (H1) and a plurality of vertical conductive wires (V1). The plurality of horizontal conductive wires (H1) and the plurality of vertical conductive wires (V1) cross each other forming the square lattice structure 106. Each of the plurality of horizontal conductive wires (H1) and each of the plurality of vertical conductive wires (V1) are equally spaced to form a plurality of square spaces therebetween. For example, each of the horizontal conductive wires (H1) and the vertical conductive wire (V1) has a wire width of 0.2 mm±0.05 mm. In an example, the first square patch antenna element 104 is made of a conductive material, for example, but not limited to, copper, nickel, aluminum, gold, silver or the like, or a metal paste or carbon paste containing these metal (fine) particles.

In a structural aspect, the first square patch antenna element 104 (square lattice structure 106) includes a plurality of columns of square spaces. In an aspect, each of the square spaces has an edge length of 2 mm±0.05 mm. For example, the plurality of columns of square spaces includes seven (7) columns of square spaces i.e., a first column of square space (C1), a second column of square space (C2), a third column of square space (C3), a fourth column of square space (C4), a fifth column of square space (C5), a sixth column of square space (C6), and a seventh column of square space (C7).

In an aspect, each of the first column (C1), the second column (C2), sixth column (C6), and seventh column (C7) includes 10 rows of square spaces. Each of the third column (C3) and fifth column (C5) includes 6 rows of square spaces. The fourth column (C4) includes 16 rows of square spaces.

The construction and operation of the second square patch antenna element 108 are substantially similar to the first square patch antenna element 104, as disclosed in FIG. 1, and thus the construction and operation are not repeated here in detail for the sake of brevity. The second square patch antenna element 108 is disposed on the transparent substrate 102. The second square patch antenna element 108 has a structure identical to the structure of the first square patch antenna element 104. The second square patch antenna element 108 includes a plurality of horizontal conductive wires (H2) and a plurality of vertical conductive wires (V2). The plurality of horizontal conductive wires (H2) and the plurality of vertical conductive wires (V2) cross each other forming a square lattice structure 110. Each of the plurality of horizontal conductive wires (H2) and plurality of vertical conductive wires (V2) are equally spaced to form a plurality of square spaces between. An enlarged portion (114) of the square lattice structure 110 illustrates the horizontal conductive wire (H2) and the vertical conductive wire (V2). As shown in FIG. 1, L is the edge length of the square space, and w is the wire width of the conductive wires.

The first square patch antenna element 104 and the second square patch antenna element 108 are spaced apart from each other. In an aspect, the space between edge 116 of the first square patch antenna element 104 and edge 118 of the second square patch antenna element 108 is 0.9 mm±0.05 mm.

The low profile transparent passive decoupling strip 112 is disposed on the transparent substrate 102 between the first square patch antenna element 104 and the second square patch antenna element 108. In an aspect, the low profile transparent passive decoupling strip 112 has a width of 0.7 mm±0.05 mm. In an example, the low profile transparent passive decoupling strip 112 has a certain reflection effect on the radiated electromagnetic wave energy of the radiating unit (antenna), thereby reducing the mutual influence between the antenna elements (104, 108) and improving isolation between the antenna elements. The low profile transparent passive decoupling strip 112 effectively improves the mutual coupling relationship of the antenna elements, and improves isolation between the antenna elements and a front-to-back ratio. In an example, the low profile transparent passive decoupling strip 112 is made of a good electrical conductor, such as copper, aluminum, etc. The low profile transparent passive decoupling strip 112 is configured to provide more than 28 dB isolation.

The antenna 100 is further configured to achieve an optical transparency (OT) of 83%±0.5%, wherein the optical transparency is calculated as:

$$OT = \left[\frac{L}{w + L}\right]^2$$

where L is the edge length of the square space having a length of 2 mm±0.05 mm and w is the wire width of the conductive wires having a width of 0.2 mm±0.05 mm. Other values of L and w are possible such as 1.8 mm±0.05 mm, 1.9 mm±0.05 mm, 2.1 mm±0.05 mm or 2.2 mm+0.05 mm.

The following examples are provided to illustrate further and to facilitate the understanding of the present disclosure.

During experimentation, the antenna 100 was stimulated using a CST Microwave Studio (a computational electromagnetics tool). The electromagnetic (EM) Performance of the disclosed antenna 100 was validated by simulation using the CST Microwave Studio. The antenna 100 is a means of transmitting energy (in the EM form) and information to a distant point in space. The antenna performance is characterized by the efficiency of transmission and the signal distortion.

During experimentation, the size for square lattice of wired metal mesh 'l' is selected as 2 mm, while width of the wires 'w' used in the square lattice structure 106, 110 is selected to achieve 83% optical transparency of the present antenna 100. The CST Microwave Studio (manufactured by Dassault Systemes Simulia Corp, located at 5181 Natorp Blvd Ste 205 Mason, OH, 45040-7987, United States) is used to design, analyze, and define the dimensions of the geometry of the first square patch antenna element 104 and the second square patch antenna element 108. The defined dimensions of the transparent MIMO antenna 100 are given in Table 1.

TABLE 1

Defined parameters for the transparent antenna 100

| Wp (width of a square patch antenna element) (mm) | Lp (length of a square patch antenna element) (mm) | Wf (width of feed portion) (mm) | Lf (length of feed portion) (mm) | Wi (inset feed width) (mm) | Li (inset feed length) (mm) | Ws (width of the low profile transparent passive decoupling strip) (mm) | Gs (gap between the antenna elements) (mm) |
|---|---|---|---|---|---|---|---|
| 16 | 16.5 | 2 | 7.75 | 6 | 3.5 | 0.7 | 0.1 |

Figure 2:
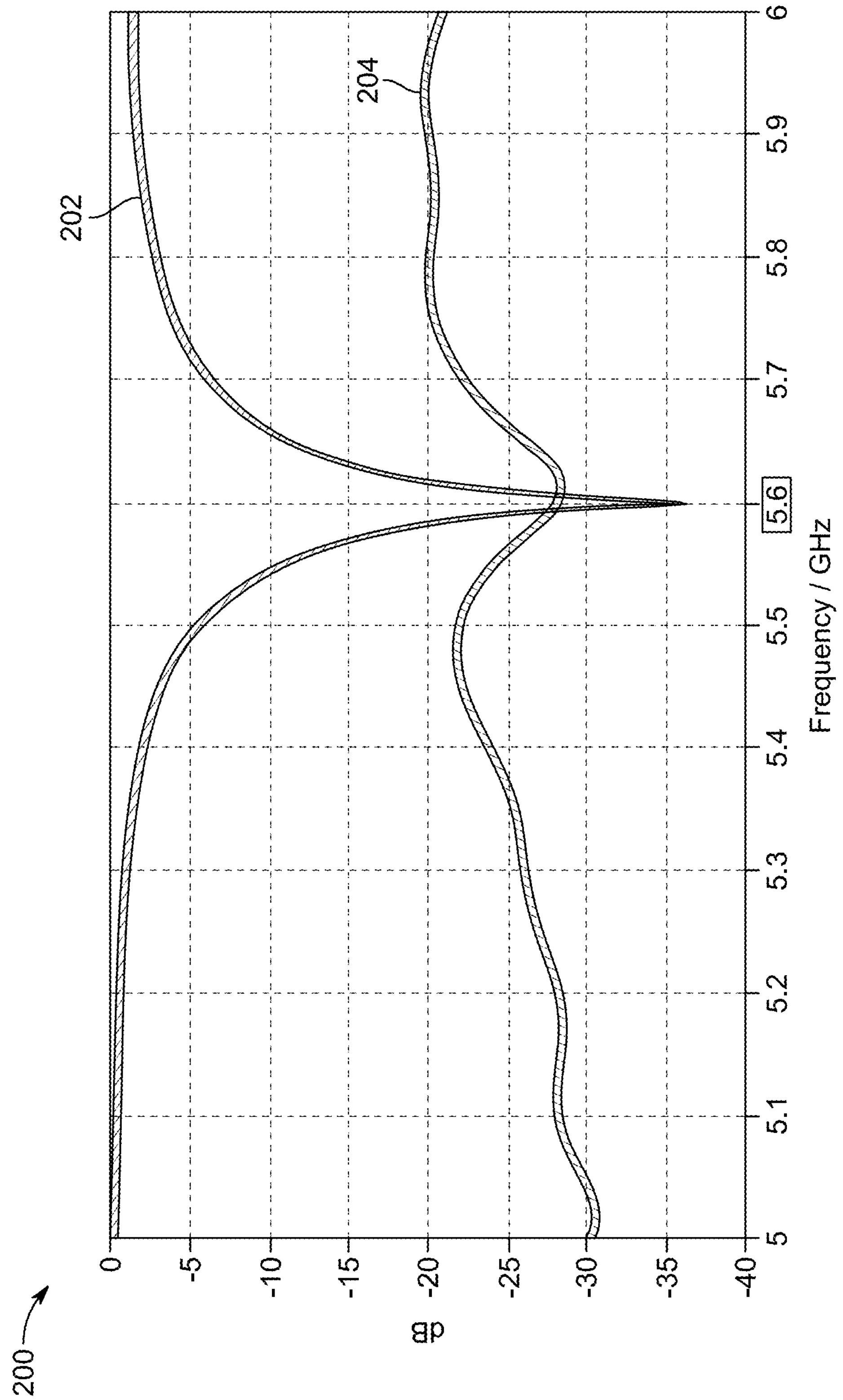
FIG. 2 is a graph of scattering parameters (s-parameters) of the transparent MIMO antenna, according to certain embodiments.

The fabricated antenna 100 was characterized for S-parameters using the CST Microwave Studio. FIG. 2 is a graph 200 of scattering parameters (S-parameters) ($S_{11}$, $S_{21}$, $S_{12}$, $S_{22}$) of the transparent MIMO antenna 100. Signal 202 represents the values of S-parameters ($S_{11}$, $S_{22}$). Further, signal 204 represents values of $S_{12}$. In an aspect, the values of $S_{12}$ is equal to the values of $S_{21}$.

Both of the antenna elements are symmetric around the low profile transparent passive decoupling strip 112, therefore S12 is overlapped on S21 and in a similar way Su and S22 are also overlapped. Both the S11 and S22 show that the transparent MIMO antenna 100 has good impedance matching at 5.6 GHz and the return loss is well below-10 dB, e.g., below −15 dB, below −20 dB, or below −30 dB, from 5.54 GHz to 5.66 GHz. The isolation (S21) between the closely spaced transparent elements is greater than 28 dB in the desired frequency band, which shows that the transparent MIMO antenna 100 may have better diversity gain performance as well as good impedance matching.

The parametric analysis of the transparent MIMO antenna 100 was performed to reveal that how to define square lattice dimensions of the wired metal mesh to achieve better performance with suitable optical transparency for the transparent MIMO antenna 100 with closely spaced antenna elements. The optical transparency (OT) for the wired metal mesh square lattice (square lattice structure 106) may be defined as:

$$OT = \left[\frac{L}{w+L}\right]^2$$

FIG. 3A-FIG. 3D illustrate parametric analysis of the transparent MIMO antenna 100 for different parameters such as optical transparency, design frequency, return loss, and isolation. The parametric analysis provides insight into how the MIMO antenna responds to changes in its constituent parameters (or independent variables). This is accomplished by selecting one or more independent variables (parameters 'w' and 'L' of the square lattice) and vary them within a given range while observing how one or more dependent variables (optical transparency, design frequency, return loss, and isolation) react.

Figure 3A:
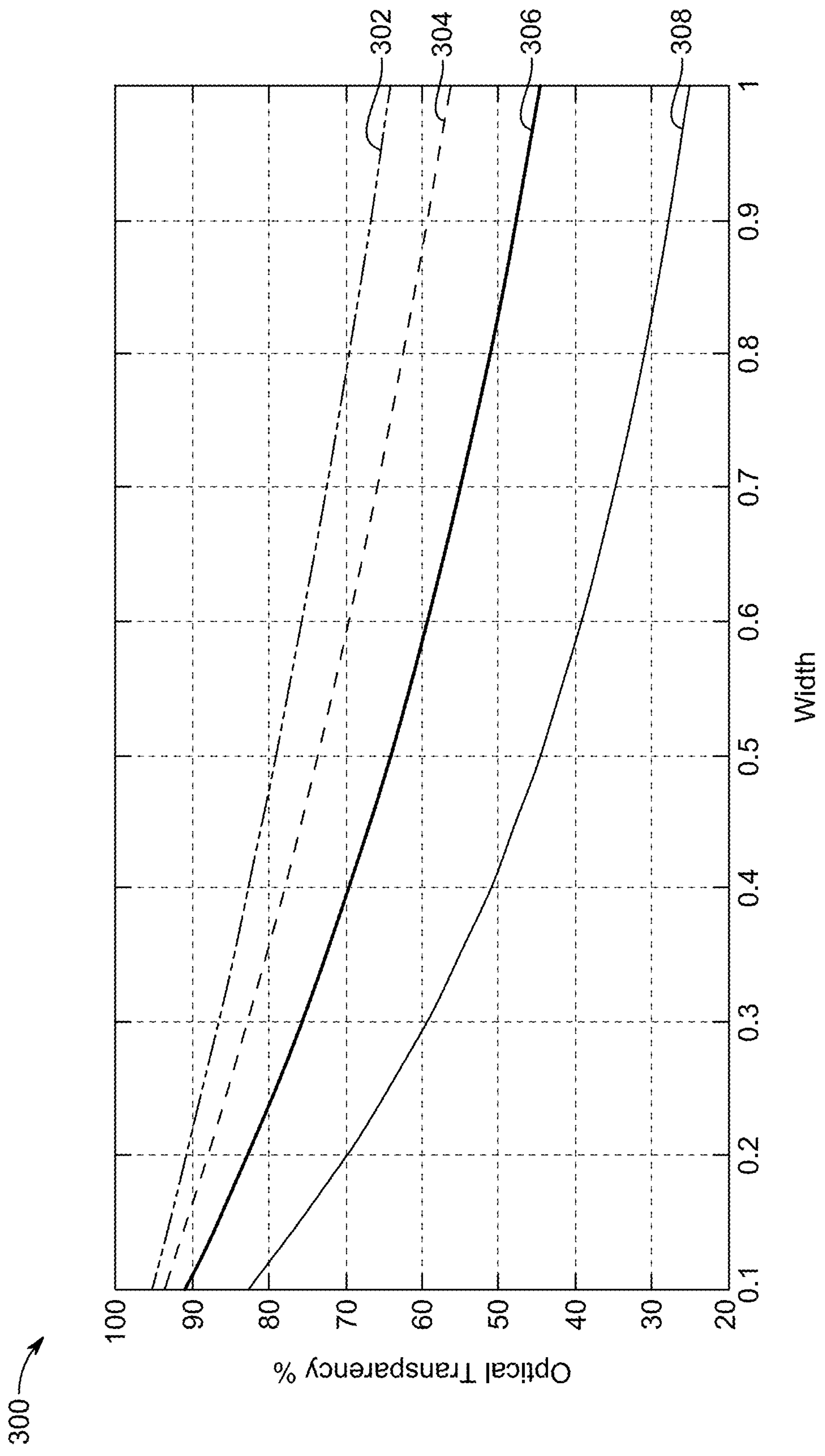
FIG. 3A is a graph of parametric analysis for optical transparency of the transparent MIMO antenna, according to certain embodiments.

FIG. 3A is a graph 300 of parametric analysis for the optical transparency of the transparent MIMO antenna 100. FIG. 3A shows the parametric analysis to analyze effect of the parameters 'w' and 'L' for the square lattice of the wired metal mesh on optical transparency of all the conducting elements including ground of the transparent MIMO antenna 100. Signal 302 represents the optical transparency of the transparent MIMO antenna 100 when the L=4 mm. Signal 304 represents the optical transparency of the transparent MIMO antenna 100 when the L=3 mm. Signal 306 represents the optical transparency of the transparent MIMO antenna 100 when the L=2 mm. Signal 308 represents the optical transparency of the transparent MIMO antenna 100 when the L=1 mm. It can be seen, from FIG. 3A, that the optical transparency of the transparent MIMO antenna 100 can be increased by increasing 'L' and decreasing 'w'.

Figure 3B:
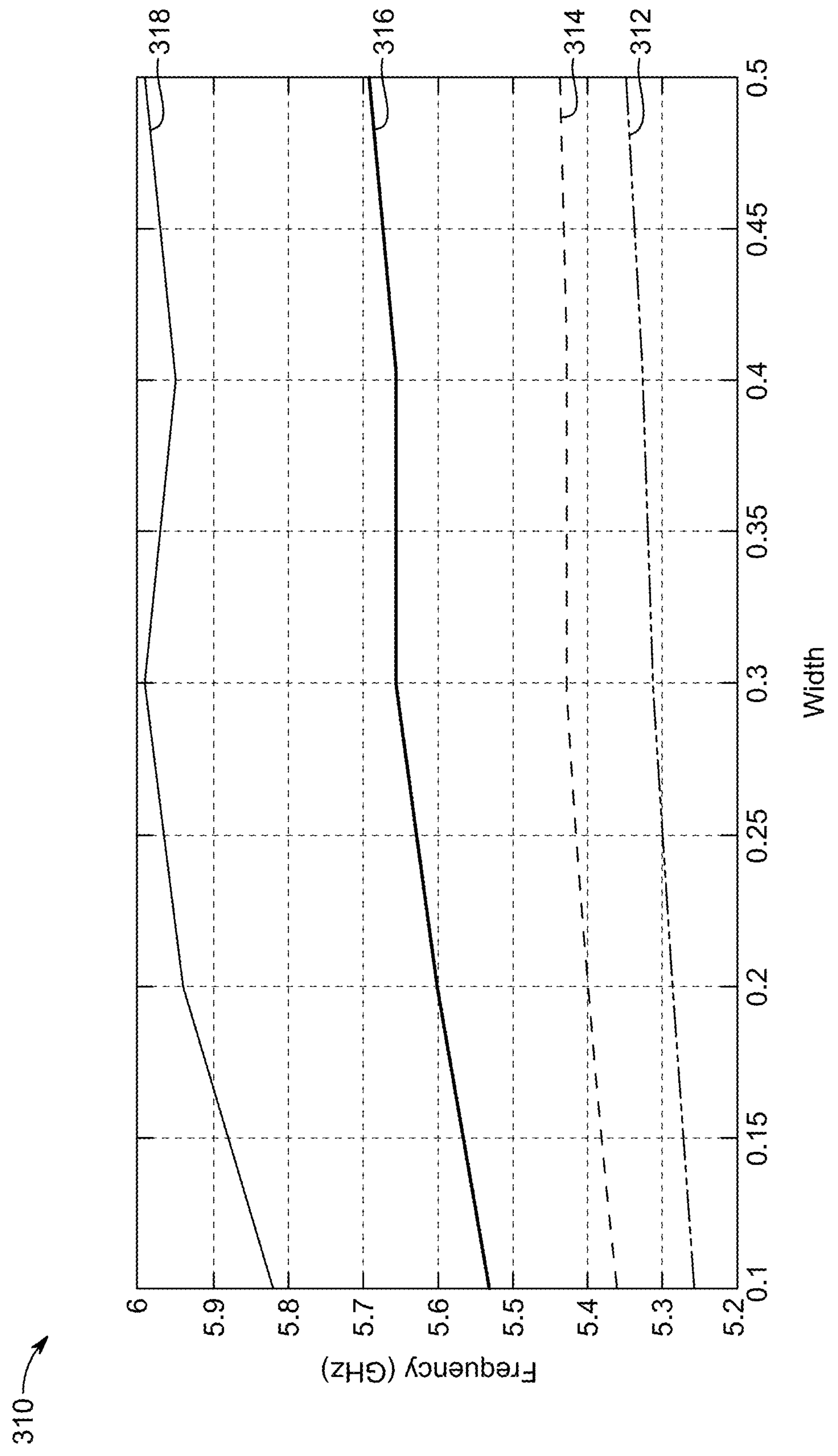
FIG. 3B is a graph of parametric analysis for design frequency of the transparent MIMO antenna, according to certain embodiments.
Figure 3C:
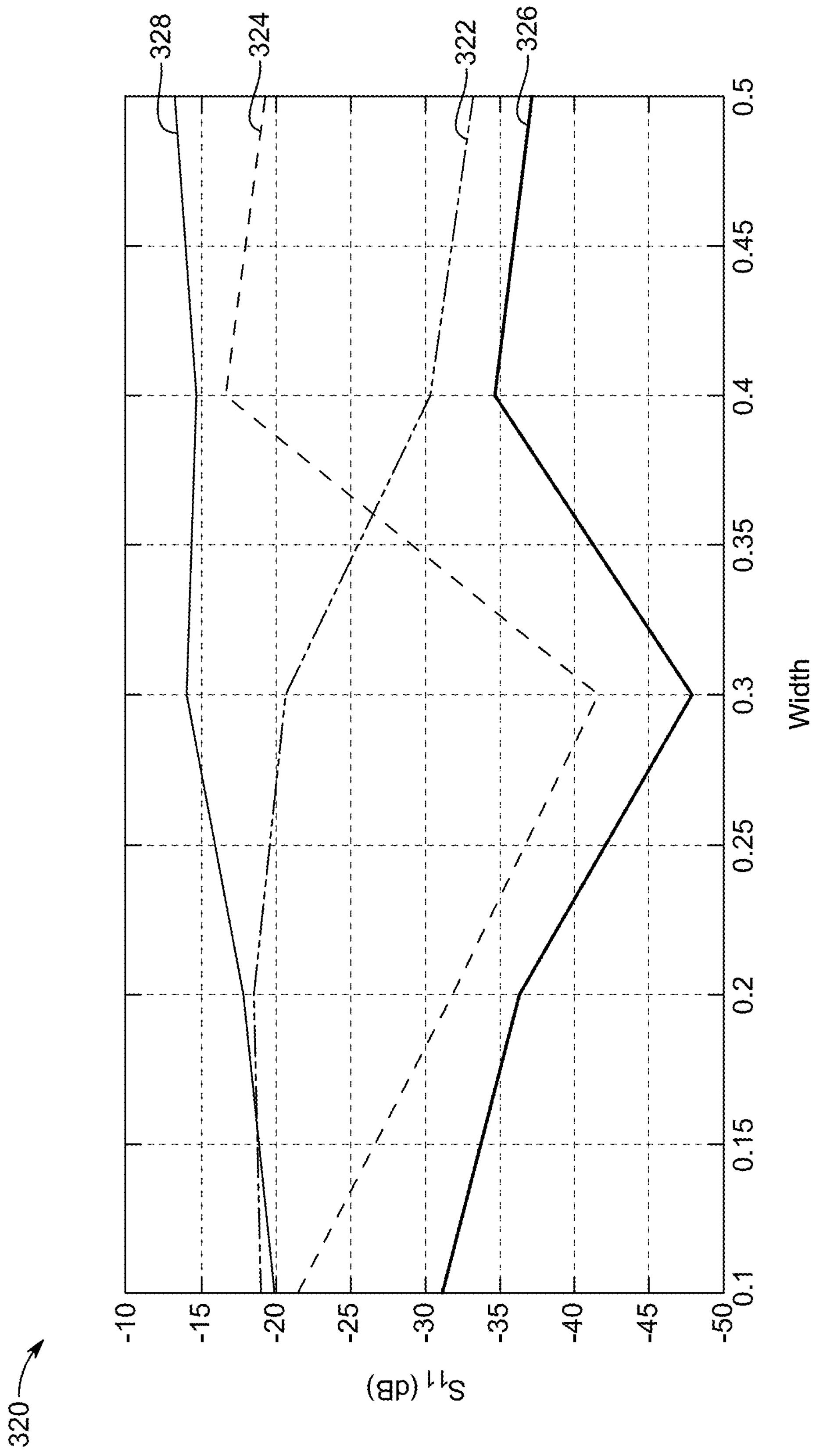
FIG. 3C is a graph of parametric analysis for return loss of the transparent MIMO antenna, according to certain embodiments.

The effect of variation in both the dimensions of the square lattice on resonant frequency, return loss and isolation is also analyzed in FIG. 3B, FIG. 3C and FIG. 3C, respectively, to achieve defined values for both the dimensions.

FIG. 3B is a graph 310 of the parametric analysis for design frequency (resonant frequency) of the transparent MIMO antenna 100. Signal 312 represents the design frequency of the transparent MIMO antenna 100 when the L=4 mm. Signal 314 represents the design frequency of the transparent MIMO antenna 100 when the L=3 mm. Signal 316 represents the design frequency of the transparent MIMO antenna 100 when the L=2 mm. Signal 318 represents the design frequency of the transparent MIMO antenna 100 when the L=1 mm. It can be seen, from FIG. 3B, that the resonant frequency increases minutely with decreases in 'L' and increase in 'w', which is due to increase in effective electrical length of the patch elements due to larger size of the square lattice.

FIG. 3C is a graph 320 of the parametric analysis for return loss of the transparent MIMO antenna 100. Signal 322 represents the return loss of the transparent MIMO antenna 100 when the L=4 mm. Signal 324 represents the return loss of the transparent MIMO antenna 100 when the L=3 mm. Signal 326 represents the return loss of the transparent MIMO antenna 100 when the L=2 mm. Signal 328 represents the return loss of the transparent MIMO antenna 100 when the L=1 mm. As shown in FIG. 3C, the return loss of each antenna elements varies randomly, and the minimum return loss is achieved for L=2 mm and w=0.3 mm.

Figure 3D:
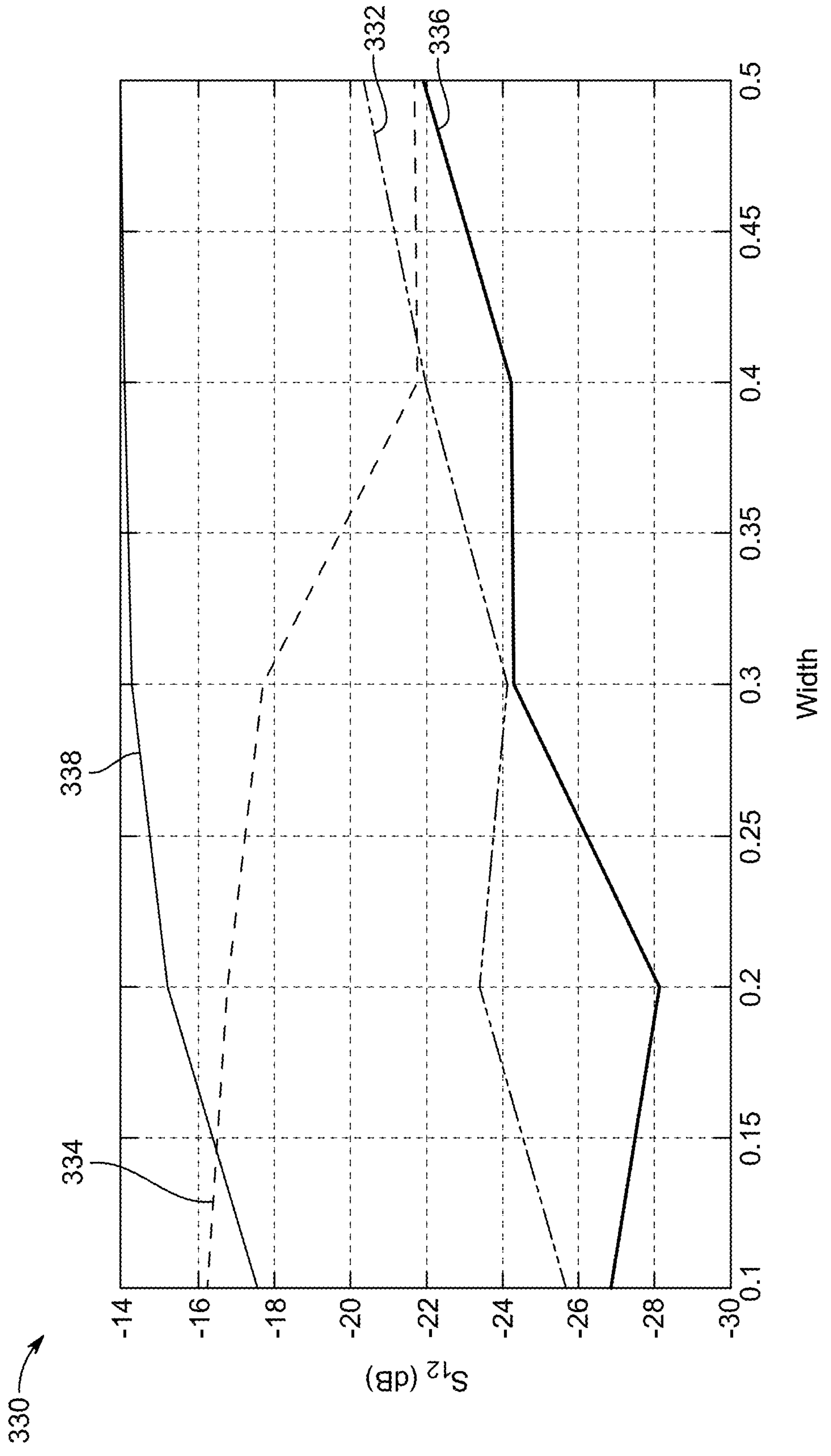
FIG. 3D is a graph of parametric analysis for isolation of the transparent MIMO antenna, according to certain embodiments.

FIG. 3D is a graph 330 of the parametric analysis for isolation of the transparent MIMO antenna 100, according to certain embodiments. Signal 332 represents the isolation of the MIMO antenna 100 when the L=1 mm. Signal 334 represents the isolation of the transparent MIMO antenna 100 when the L=3 mm. Signal 336 represents the isolation of the transparent MIMO antenna 100 when the L=2 mm. Signal 338 represents the isolation of the transparent MIMO antenna 100 when the L=4 mm. As shown in FIG. 3C, the isolation between the patch elements also varies randomly and the maximum Isolation is achieved for L=2 mm and W=0.2 mm. Through the experimentation, it is found that L=2 mm and W=0.2 mm are the maximum appropriate dimensions of the square lattice to achieve defined values for transparency (83%), return loss (38 dB) and isolation (28 dB) at 5.6 GHz.

The performance of the transparent MIMO antenna 100 is also analyzed in terms of radiation pattern, gain, radiation efficiency, total efficiency, envelope correlation coefficient (ECC), diversity gain and Total Active Reflection Coefficient (TARC).

The radiation pattern (or antenna pattern or far-field pattern) refers to the directional (angular) dependence of the strength of the radio waves from the antenna or other source. To understand the antenna's radiation pattern, in experimentation, each of the antenna elements was provided with input signals.

Figure 4A:
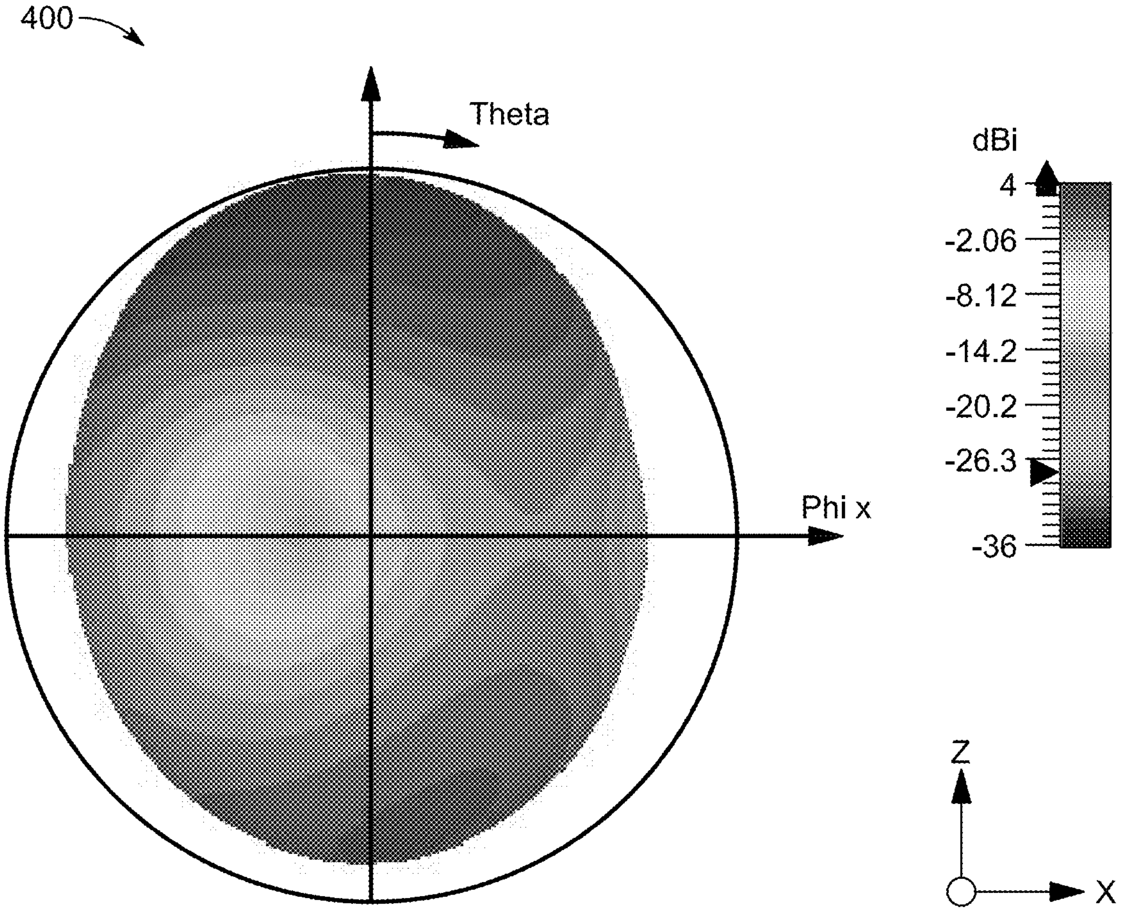
FIG. 4A is a graph of a three-dimensional (3-D) radiation pattern of the transparent MIMO antenna at 5.6 GHz, according to certain embodiments.
Figure 4B:
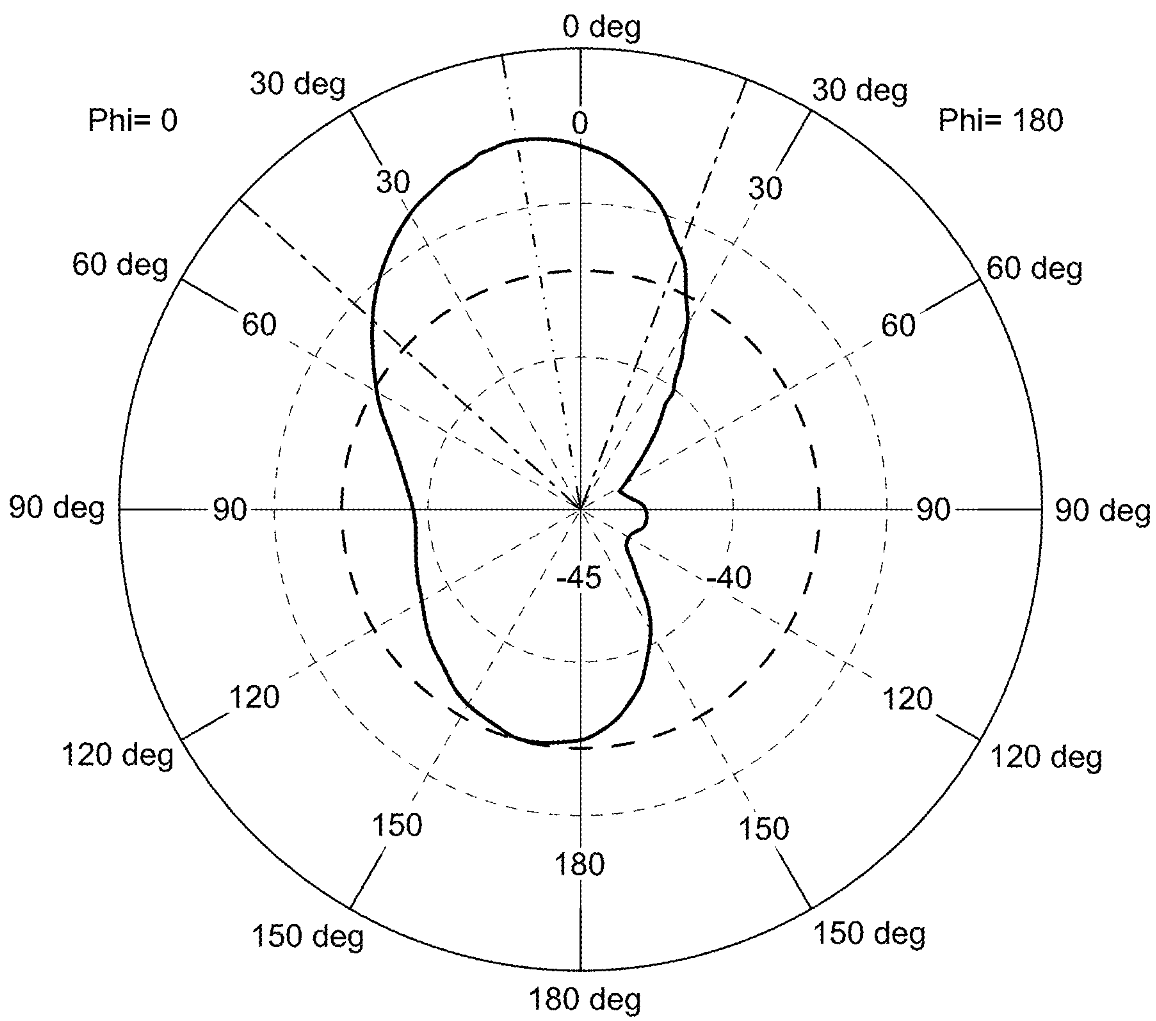
FIG. 4B is a graph of a two-dimensional (2-D) radiation pattern of the transparent MIMO antenna at 5.6 GHz in H-plane, according to certain embodiments.
Figure 4C:
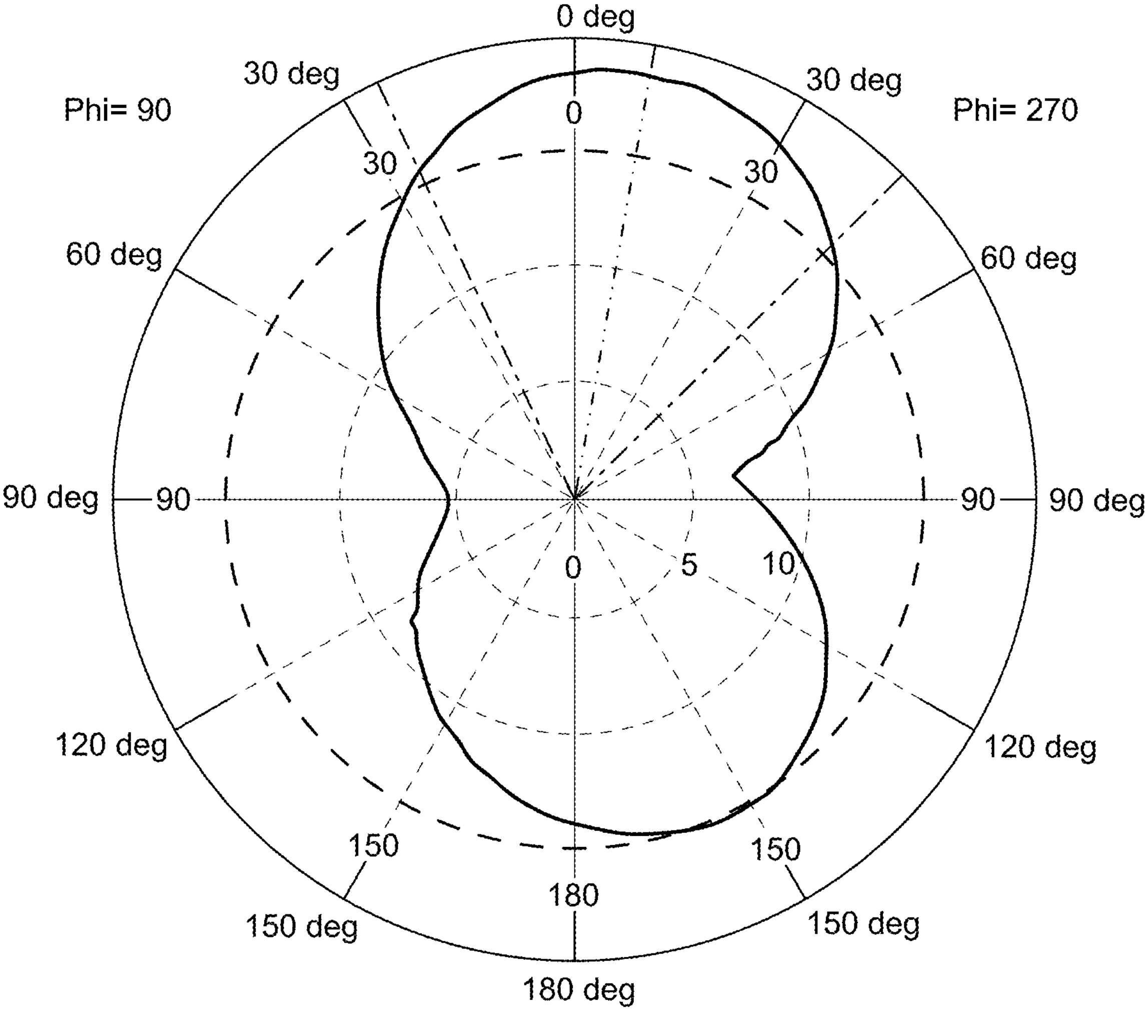
FIG. 4C is a graph of the 2-D radiation pattern of the transparent MIMO antenna at 5.6 GHz E-plane, according to certain embodiments.

The radiation performance for one of the transparent patch antenna element at 5.6 GHz is shown in FIG. 4A-FIG. 4C. FIG. 4A is a graph 400 of a three-dimensional (3-D) radiation pattern of the transparent MIMO antenna 100 at 5.6 GHz.

FIG. 4B is a graph 410 of a two-dimensional (2-D) radiation pattern of the transparent MIMO antenna 100 at 5.6 GHz in H-plane. Signal 412 represents the radiation pattern of the MIMO antenna 100 in H-plane. In a linearly polarized antenna, H-plane is a plane containing the magnetic field vector and the direction of maximum radiation. The magnetizing field or "H" plane lies at a right angle to the "E" plane. For a vertically polarized antenna, the H-plane coincides with the horizontal/azimuth plane. For a horizontally polarized antenna, the H-plane usually coincides with the vertical/elevation plane.

FIG. 4C is a graph 420 of the 2-D radiation pattern of the transparent MIMO antenna 100 at 5.6 GHz in E-plane. Signal 422 represents the radiation pattern of the MIMO antenna 100 in E-plane. For the linearly polarized antenna, E-plane is a plane containing the electric field vector and the direction of maximum radiation. The electric field or "E" plane determines the polarization or orientation of the radio wave. For a vertically polarized antenna, the E-plane usually coincides with the vertical/elevation plane. For a horizontally polarized antenna, the E-Plane usually coincides with the horizontal/azimuth plane.

As shown in FIG. 4A-FIG. 4C, the transparent antenna 100 achieves a realized gain of 4 dB, radiation efficiency of 65% and total efficiency 64.5%, which is considered significant performance for a transparent antenna 100. Similar radiation performance is observed for the second closely spaced transparent antenna element.

For an antenna (s) for transmitting simultaneous and independent data streams, isolation is required between the antenna (s) such that each of antenna work independently without affecting other's performance. The antennas should have good isolation, and their radiation patterns should not be same, or at least not very "correlated". To measure the isolation between the antennas Envelope Correlation Coefficient (ECC) is calculated.

The ECC describes how independent two antennas' radiation patterns are. For example, if one antenna is completely horizontally polarized, and the other is completely vertically polarized, then the two antennas would have a correlation of zero. In similar manner, if one antenna only radiated energy towards the sky, and the other only radiated energy towards the ground, these antennas would also have an ECC of 0. The ECC is considered as an important factor for accounting the antennas' radiation pattern shape, polarization, a relative phase of the fields between the two antennas.

Figure 5:
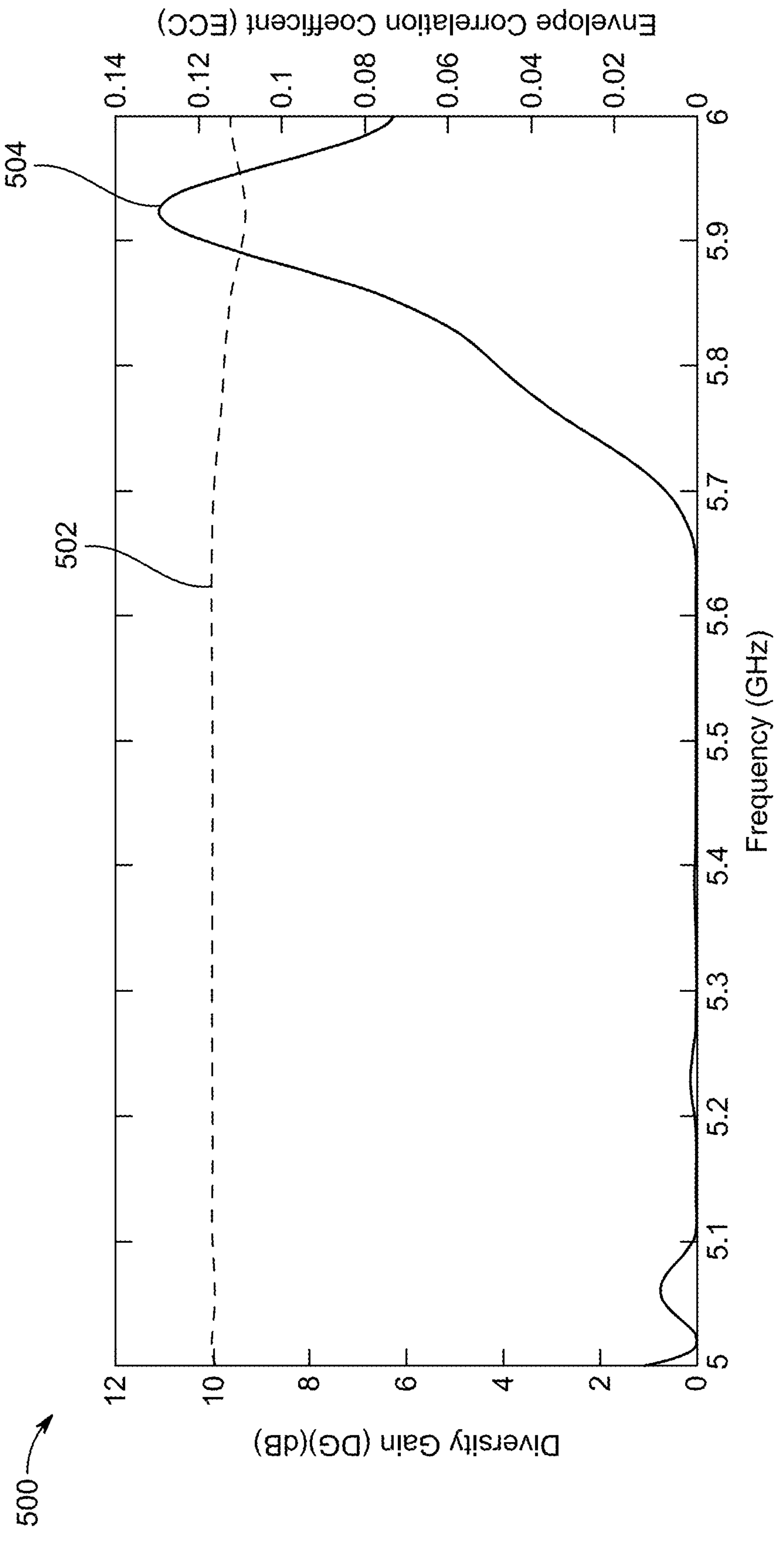
FIG. 5 is a graph of an envelope correlation coefficient (ECC) and diversity gain performance of the transparent MIMO antenna, according to certain embodiments.

FIG. 5 is a graph 500 of envelope correlation coefficient (ECC) and diversity gain performance of the transparent MIMO antenna 100. The envelope correlation coefficient (ECC) and the diversity gain performance of the transparent MIMO antenna 100 is also exhibited in FIG. 5. Signal 502 represents the diversity gain of the transparent MIMO antenna 100. Signal 504 represents the ECC of the transparent MIMO antenna 100. It can be seen from the FIG. 5 that the ECC remains below 0.005, which exhibits excellent diversity gain performance of nearly equal to 10 for the transparent MIMO antenna 100.

Figure 6:
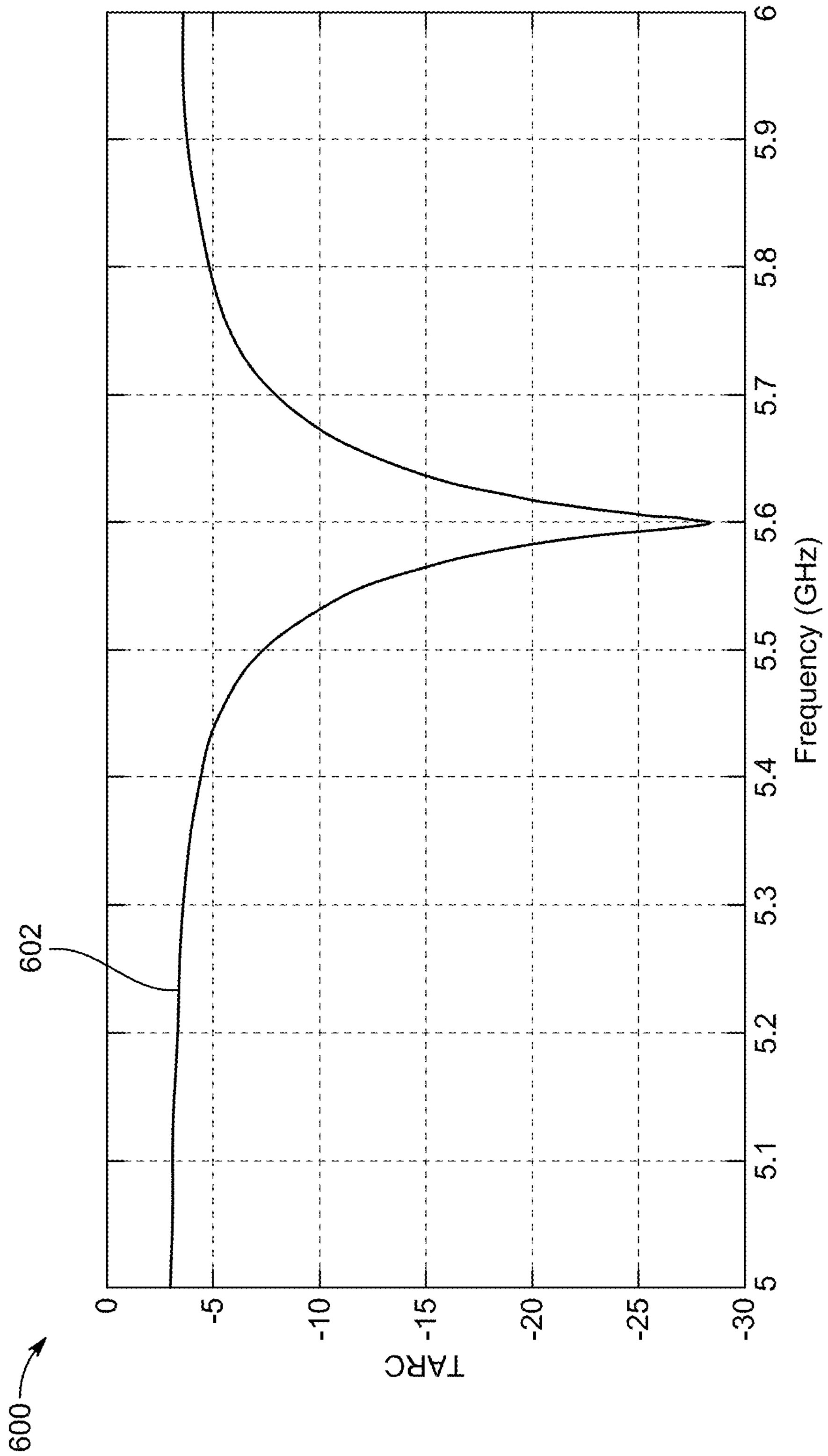
FIG. 6 is a graph of a total effective reflection coefficient (TARC) for the transparent MIMO antenna, according to certain embodiments.

Information on S-parameters are not sufficient to fully characterize a MIMO antenna. For proper characterization of the transparent MIMO antenna 100, total active reflection coefficient (TARC) got introduced. TARC of the transparent MIMO antenna 100 is defined as the ratio of square root of the total reflected power to the square of root of total incident power. FIG. 6 is a graph 600 of TARC for the transparent MIMO antenna 100. Signal 602 represents the TARC of the transparent MIMO antenna 100. The TARC performance of the transparent MIMO antenna 100 is also shown in FIG. 6, which is-28 dB at 5.6 GHz.

The transparent MIMO antenna 100 operates at 5.6 GHz, and an insert feed technique is used for impedance matching. The transparent MIMO antenna 100 performance is also exhibited through realized gain, radiation efficiency, total efficiency, envelope correlation coefficient (ECC), diversity gain and Total Active Reflection Coefficient (TARC). All the performance parameters also confirms the suitability of the transparent MIMO antenna 100. The transparent MIMO antenna 100 can be a potential candidate for applications which require compactness as well as suitable optical transparency and may have a key role in future smart wireless gadgets.

The first embodiment is illustrated with respect to FIG. 1. The first embodiment describes an antenna 100. The MIMO antenna 100 includes a transparent substrate 102, a first square patch antenna element 104 with a square lattice structure 106, a second square patch antenna element 108 with a square lattice structure 110, and a low profile transparent passive decoupling strip 112. The first square patch antenna element 104 with the square lattice structure 106 is disposed on the transparent substrate 102. The first square patch antenna element 104 includes horizontal conductive wires (H1) and vertical conductive wires (V1). The horizontal conductive wires and the vertical conductive wires cross each other and are equally spaced to form square spaces between. The second square patch antenna element 108 with the square lattice structure 110 is disposed on the transparent substrate 102. The second square patch antenna element 108 has a structure identical to the structure of the first square patch antenna element 104. The first and the second square patch antenna elements are spaced apart from each other. The low profile transparent passive decoupling strip 112 is disposed on the transparent substrate 102 between the first and the second square patch antenna elements.

In an aspect, the first square patch antenna element 104 is further configured to have 7 columns of square spaces wherein: the first, second, sixth, and seventh column includes 10 rows of square spaces, the third and fifth column includes 6 rows of square spaces, and the fourth column includes 16 rows of square spaces.

In an aspect, the transparent substrate 102 is a polyethylene terephthalate (PET) film.

In an aspect, the transparent substrate 102 includes a stack of 10 PET layers each having a thickness of 0.1 mm±0.05 mm, and the transparent substrate 102 has a dielectric constant of 3.3.

In an aspect, the low profile transparent passive decoupling strip 112 has a width of 0.7 mm±0.05 mm.

In an aspect, the square spaces have an edge length of 2 mm±0.05 mm.

In an aspect, the horizontal conductive wires and vertical conductive wires have a wire width of 0.2 mm±0.05 mm.

In an aspect, the space between the first square patch antenna element 104 and the second square patch antenna element 108 is 0.9 mm±0.05 mm.

In an aspect, the antenna is further configured to achieve an optical transparency (OT) of 83%±0.5%, wherein the optical transparency is calculated as:

$$OT = \left[\frac{L}{w + L}\right]^2$$

where L is the edge length of the square space having a length of 2 mm±0.05 mm and w is the wire width of the conductive wires having a width of 0.2 mm±0.05 mm.

The second embodiment is illustrated with respect to FIG. 1. The second embodiment describes an antenna 100. The antenna 100 includes a transparent substrate 102, a first square patch antenna element 104 with a square lattice structure 106, a second square patch antenna element 108, and a low profile transparent passive decoupling strip 112. The first square patch antenna element 104 with a square lattice structure 106 is disposed on the transparent substrate 102. The first square patch antenna element 104 includes horizontal conductive wires and vertical conductive wires. The horizontal conductive wires and the vertical conductive wires cross each other and are equally spaced to form square spaces between. The second square patch antenna element 108 is disposed on the transparent substrate 102. The second square patch antenna element 108 has a structure identical to the structure of the first square patch antenna element 104. The first and the second square patch antenna elements are spaced apart from each other. The low profile transparent passive decoupling strip 112 is disposed on the transparent substrate 102 between the first and the second square patch antenna elements. The first square patch antenna element 104 and the second square patch antenna element are further configured to have 7 columns of square spaces, wherein: the first, second, sixth, and seventh column includes 10 rows of square spaces, the third and fifth column includes 6 rows of square spaces, and the fourth column includes 16 rows of square spaces.

In an aspect, the transparent substrate 102 is a polyethylene terephthalate (PET) film.

In an aspect, the transparent substrate 102 includes a stack of 10 PET layers each having a thickness of 0.1 mm±0.05 mm, and the transparent substrate 102 has a dielectric constant of 3.3.

In an aspect, the low profile transparent passive decoupling strip 112 has a width of 0.7 mm±0.05 mm.

In an aspect, the square spaces have an edge length of 2 mm±0.05 mm.

In an aspect, the horizontal conductive wires and vertical conductive wires have a wire width of 0.2 mm±0.05 mm.

In an aspect, the space between the first square patch antenna element 104 and the second square patch antenna element 108 is 0.9 mm±0.05 mm.

In an aspect, the antenna is further configured to achieve an optical transparency (OT) of 83%±0.5%, wherein the optical transparency is calculated as:

$$OT = \left[\frac{L}{w + L}\right]^2$$

where L is the edge length of the square space having a length of 2 mm±0.05 mm and w is the wire width of the conductive wires having a width of 0.2 mm±0.05 mm.

The third embodiment is illustrated with respect to FIG. 1. The third embodiment describes an antenna 100. The antenna 100 includes a transparent substrate 102, a first square patch antenna element 104 with a square lattice structure 106, a second square patch antenna element 108 with a square lattice structure 110, and a low profile transparent passive decoupling strip 112. The first square patch antenna element 104 with the square lattice structure 106 is disposed on the transparent substrate 102. The first square patch antenna element 104 includes horizontal conductive wires and vertical conductive wires, wherein the horizontal conductive wires and the vertical conductive wires cross each other and are equally spaced to form square spaces between. The second square patch antenna element 108 with the square lattice structure 110 is disposed on the transparent substrate 102. The second square patch antenna element 108 has a structure identical to the structure of the first square patch antenna element 104. The first and the second square patch antenna elements are spaced apart from each other. The low profile transparent passive decoupling strip 112 is disposed on the transparent substrate 102 between the first and the second square patch antenna elements, wherein: the antenna is further configured to achieve an optical transparency (OT) of 83%±0.5%, wherein the optical transparency is calculated as:

$$OT = \left[\frac{L}{w + L}\right]^2$$

where L is the edge length of the square space having a length of 2 mm±0.05 mm and w is the wire width of the conductive wires having a width of 0.2 mm±0.05 mm.

In an aspect, the first square patch antenna element 104 is further configured to have 7 columns of square spaces wherein: the first, second, sixth, and seventh column includes 10 rows of square spaces, the third and fifth column includes 6 rows of square spaces, and the fourth column includes 16 rows of square spaces.

In an aspect, the transparent substrate 102 is a polyethylene terephthalate (PET) film.

Numerous modifications and variations of the present disclosure are possible in light of the above teachings. It is therefore to be understood that within the scope of the appended claims, the invention may be practiced otherwise than as specifically described herein.

What is claimed is:

1. An antenna, comprising:

a transparent substrate;

a first square patch antenna element with a first square lattice structure deposited on the transparent substrate;

a second square patch antenna element with a second square lattice structure deposited on the same side of the transparent substrate as the first square patch antenna element, the second square patch antenna element being spaced apart from the first square patch antenna element in a first direction; and a low profile transparent passive decoupling strip deposited on the transparent substrate between the first and the second square patch antenna elements in the first direction, wherein an optical transparency of the antenna is 83%±0.5%, the first square lattice structure comprises horizontal conductive wires and vertical conductive wires that cross each other, with both the horizontal conductive wires and the vertical conductive wires equally spaced to form square spaces therebetween, the second square lattice structure has a structure identical to that of the first square lattice structure, in the first direction, a size of the low profile transparent passive decoupling strip is less than that of the first square lattice structure or the second square lattice structure, and in a second direction that is perpendicular to the first direction, a size of the low profile transparent passive decoupling strip is less than that of the first square lattice structure or the second square lattice structure.

2. The antenna according to claim 1, wherein the first square patch antenna element has 7 columns of square spaces in the first direction;

wherein the first, second, sixth, and seventh column includes 10 rows of square spaces in the second direction;

wherein the third and fifth column includes 6 rows of square spaces in the second direction; and wherein the fourth column includes 16 rows of square spaces in the second direction.

3. The antenna according to claim 1, wherein the transparent substrate is a polyethylene terephthalate (PET) film.

4. The antenna according to claim 3, wherein said transparent substrate includes a stack of 10 PET layers each having a thickness of 0.1 mm±0.05 mm, and the transparent substrate has a dielectric constant of 3.3.

5. The antenna according to claim 1, wherein the low profile transparent passive decoupling strip has a width in the first direction of 0.7 mm±0.05 mm.

6. The antenna according to claim 1, wherein said square spaces have an edge length of 2 mm±0.05 mm.

7. The antenna according to claim 1, wherein said horizontal conductive wires and vertical conductive wires have a wire width of 0.2 mm±0.05 mm.

8. The antenna according to claim 1, wherein the distance between the first square patch antenna element and the second square patch antenna element in the first direction is 0.9 mm±0.05 mm.

9. The antenna according to claim 1, wherein the optical transparency is calculated as:

$$OT = \left[\frac{L}{w + L}\right]^2$$

where L is the edge length of the square space having a length of 2 mm±0.05 mm and w is the wire width of the conductive wires having a width of 0.2 mm±0.05 mm.

10. An antenna, comprising:

a transparent substrate;

a first square patch antenna element with a first square lattice structure deposited on the transparent substrate;

a second square patch antenna element with a second square lattice structure deposited on the same side of the transparent substrate as the first square patch antenna element, the second square patch antenna element being spaced apart from the first square patch antenna element in a first direction; and a low profile transparent passive decoupling strip deposited on the transparent substrate between the first and the second square patch antenna elements in the first direction, wherein an optical transparency of the antenna is 83%±0.5%, the first square lattice structure comprises horizontal conductive wires and vertical conductive wires that cross each other, with both the horizontal conductive wires and the vertical conductive wires equally spaced to form square spaces therebetween, the second square lattice structure has a structure identical to that of the first square lattice structure, in the first direction, a size of the low profile transparent passive decoupling strip is less than that of the first square lattice structure or the second square lattice structure, in a second direction that is perpendicular to the first direction, a size of the low profile transparent passive decoupling strip is less than that of the first square lattice structure or the second square lattice structure, the first square patch antenna element and the second square patch antenna element each have 7 columns of square spaces in the first direction, the first, second, sixth, and seventh column includes 10 rows of square spaces in the second direction, the third and fifth column includes 6 rows of square spaces in the second direction, and the fourth column includes 16 rows of square spaces in the second direction.

11. The antenna according to claim 10, wherein the transparent substrate is a polyethylene terephthalate (PET) film.

12. The antenna according to claim 11, wherein said transparent substrate includes a stack of 10 PET layers each having a thickness of 0.1 mm±0.05 mm, and the transparent substrate has a dielectric constant of 3.3.

13. The antenna according to claim 10, wherein the low profile transparent passive decoupling strip has a width in the first direction of 0.7 mm±0.05 mm.

14. The antenna according to claim 10, wherein said square spaces have an edge length of 2 mm±0.05 mm.

15. The antenna according to claim 10, wherein said horizontal conductive wires and vertical conductive wires have a wire width of 0.2 mm±0.05 mm.

16. The antenna according to claim 10, wherein the space between the first square patch antenna element and the second square patch antenna element in the first direction is 0.9 mm±0.05 mm.

17. The antenna according to claim 10, wherein the optical transparency is calculated as:

$$OT = \left[\frac{L}{w + L}\right]^2$$

where L is the edge length of the square space having a length of 2 mm±0.05 mm and w is the wire width of the conductive wires having a width of 0.2 mm±0.05 mm.

18. An antenna, comprising:

a transparent substrate;

a first square patch antenna element with a first square lattice structure deposited on the transparent substrate;

a second square patch antenna element with a second square lattice structure deposited on the same side of the transparent substrate as the first square patch antenna element, the second square patch antenna element being spaced apart from the first square patch antenna element in a first direction; and a low profile transparent passive decoupling strip deposited on the transparent substrate between the first and the second square patch antenna elements in the first direction, wherein an optical transparency of the antenna is 83%±0.5%, the first square lattice structure comprises horizontal conductive wires and vertical conductive wires that cross each other, with both the horizontal conductive wires and the vertical conductive wires equally spaced to form square spaces therebetween, the second square lattice structure has a structure identical to that of the first square lattice structure, in the first direction, a size of the low profile transparent passive decoupling strip is less than that of the first square lattice structure or the second square lattice structure, in a second direction that is perpendicular to the first direction, a size of the low profile transparent passive decoupling strip is less than that of the first square lattice structure or the second square lattice structure, and the optical transparency is calculated as:

$$OT = \left[\frac{L}{w+L}\right]^2$$

where L is the edge length of the square space having a length of 2 mm±0.05 mm and w is the wire width of the conductive wires having a width of 0.2 mm±0.05 mm.

19. The antenna according to claim 18, wherein the first square patch antenna element is further configured to have 7 columns of square spaces in the first direction, the first, second, sixth, and seventh column includes 10 rows of square spaces in the second direction;

the third and fifth column includes 6 rows of square spaces in the second direction; and the fourth column includes 16 rows of square spaces in the second direction.

20. The antenna according to claim 18, wherein the transparent substrate is a polyethylene terephthalate (PET) film.

* * * * *